Sept. 14, 1954    F. H. KAYLER    2,689,051
COUPLER
Filed April 19, 1949    6 Sheets-Sheet 1

INVENTOR.
Frank H. Kayler
BY
Orrin O. B. Garner
Atty.

Sept. 14, 1954    F. H. KAYLER    2,689,051
COUPLER
Filed April 19, 1949    6 Sheets-Sheet 2

INVENTOR.
Frank H. Kayler
BY
O. B. Garner
Atty.

Sept. 14, 1954  F. H. KAYLER  2,689,051
COUPLER
Filed April 19, 1949  6 Sheets-Sheet 3
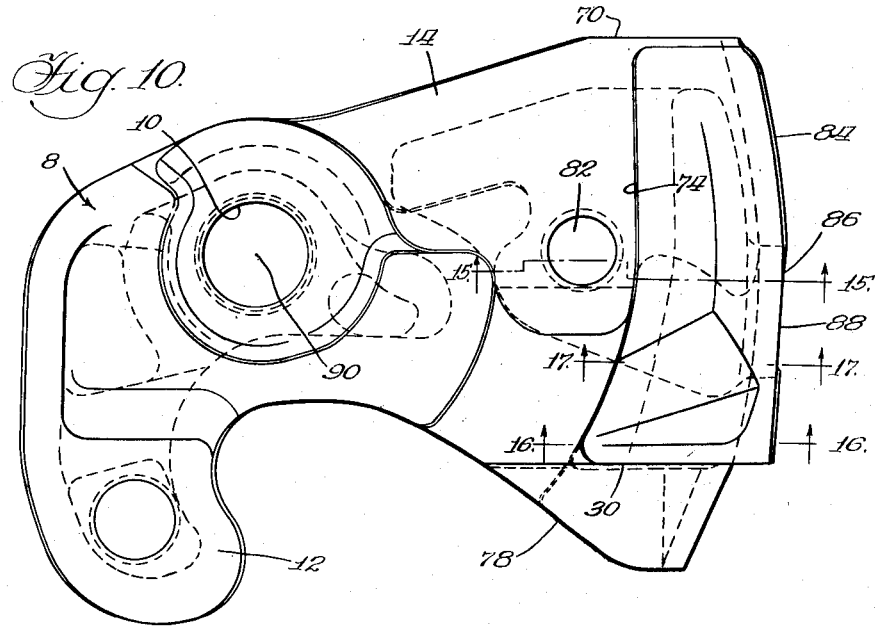
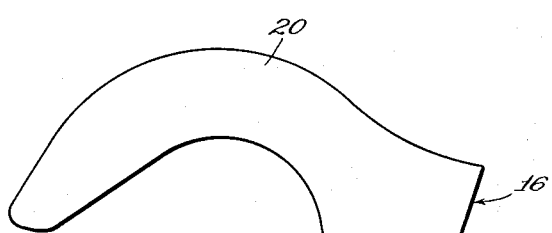
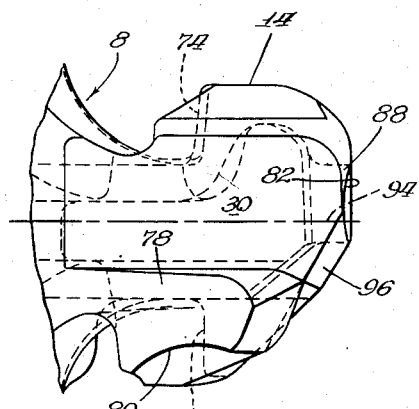
INVENTOR.
Frank H. Kayler
BY
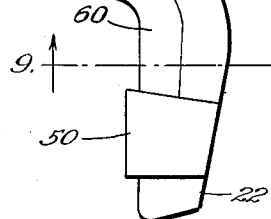

Sept. 14, 1954 F. H. KAYLER 2,689,051
COUPLER
Filed April 19, 1949 6 Sheets-Sheet 4
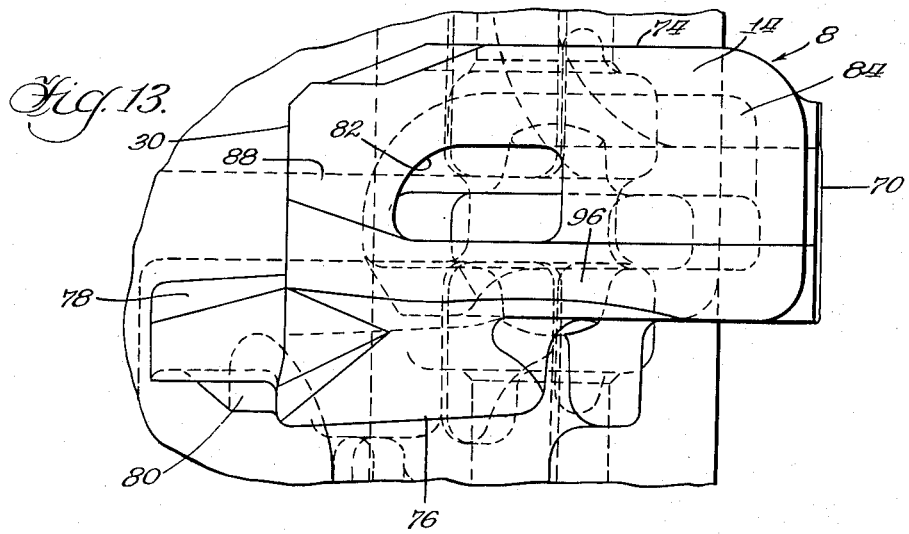
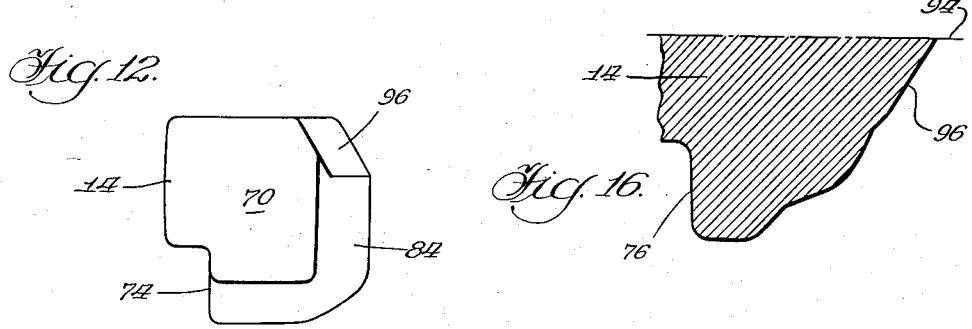
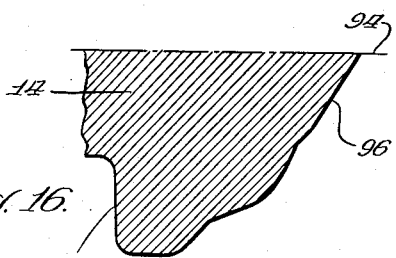
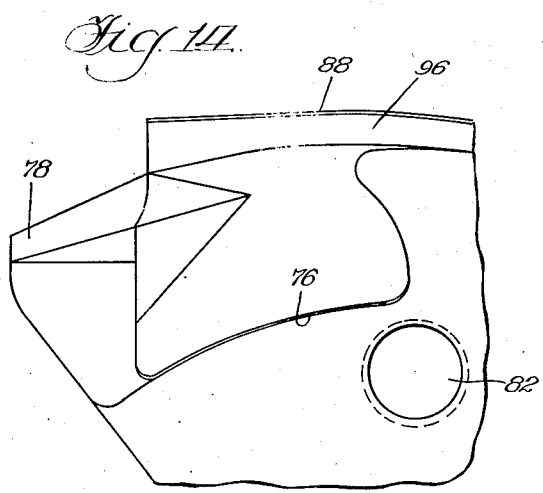
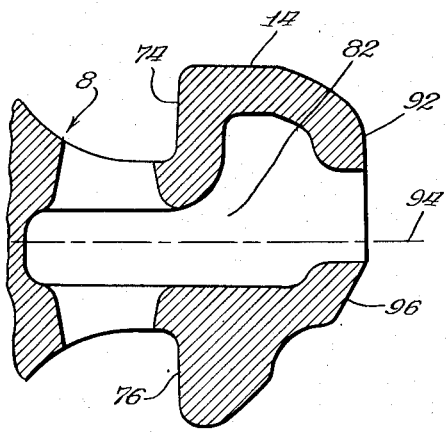
INVENTOR.
Frank H. Kayler
BY
Atty.

Sept. 14, 1954 F. H. KAYLER 2,689,051
COUPLER
Filed April 19, 1949 6 Sheets-Sheet 5
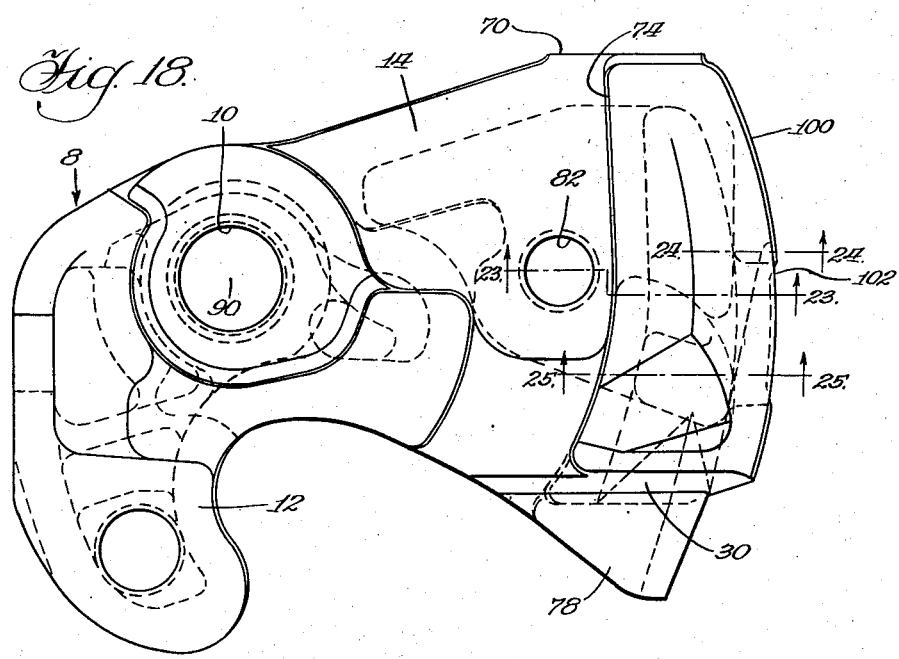
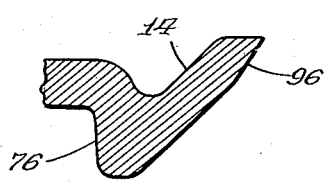
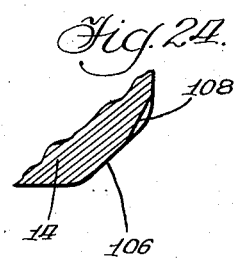
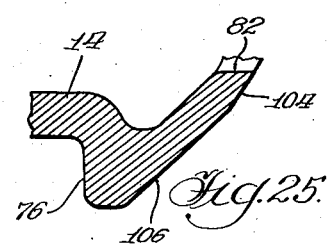
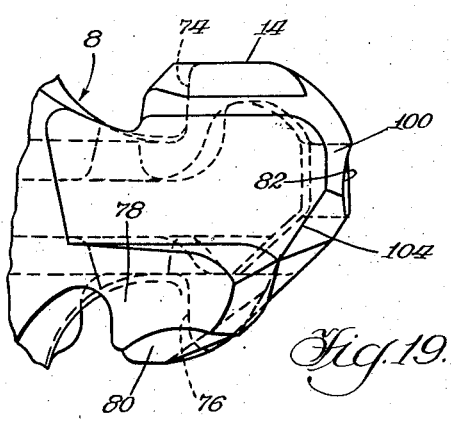
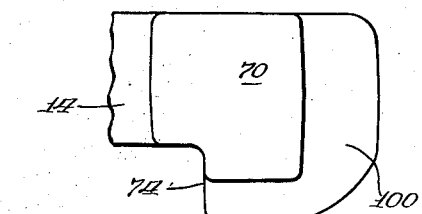
INVENTOR.
Frank H. Kayler
BY
Attÿ.

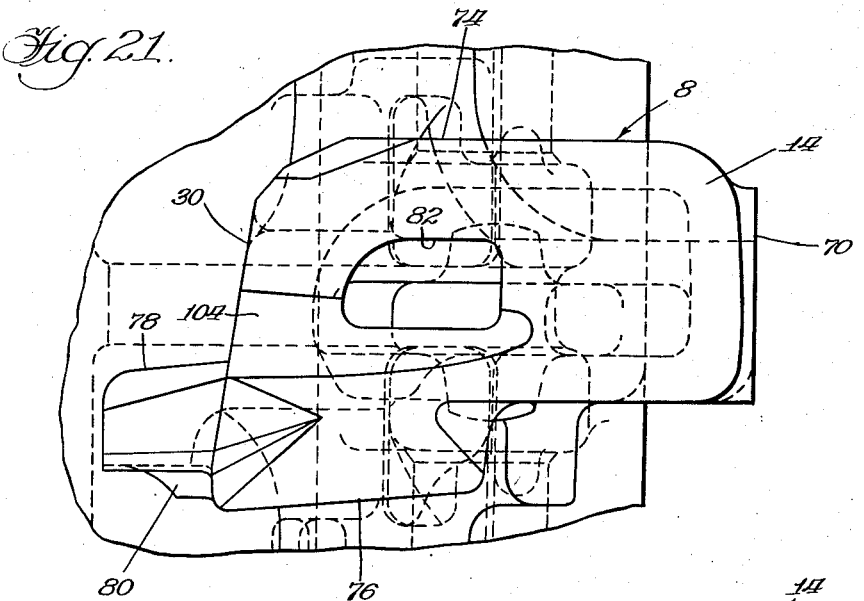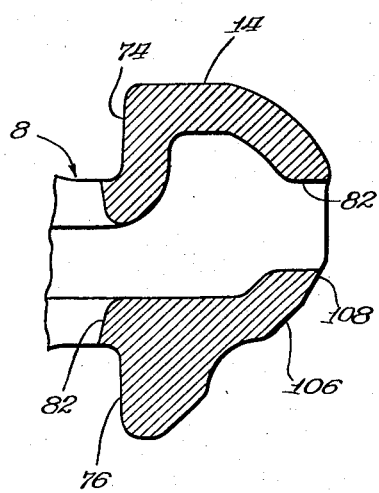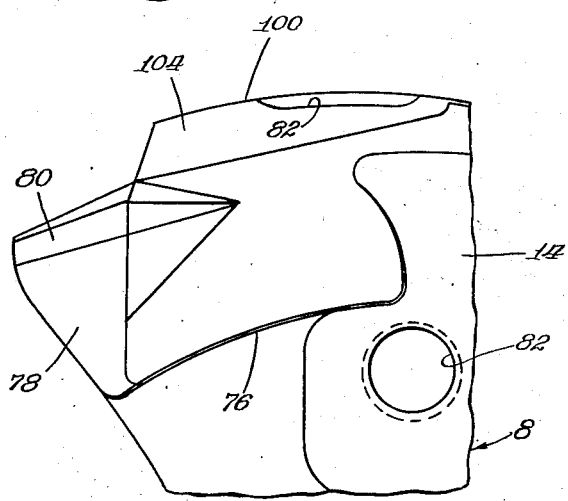

Patented Sept. 14, 1954

2,689,051

UNITED STATES PATENT OFFICE 2,689,051

COUPLER

Frank H. Kayler, Alliance, Ohio, assignor to American Steel Foundries, Chicago, Ill., a corporation of New Jersey Application April 19, 1949, Serial No. 88,310

6 Claims. (Cl. 213—146)

This invention relates to automatic couplers for railway cars and more particularly to a design of coupler typified by the A. A. R. Standard Tight-Lock coupler and the presently proposed Type F coupler. This type of coupler is disclosed in detail by United States Patent No. 2,350,740, issued June 6, 1944, to Metzger.

Since adoption by the railroads of the A. A. R. Standard Tight-Lock coupler, difficulties in operation as to lockset and disturbance from lockset have been experienced. With the parts manufactured in accordance with standard drawings and ordinary commercial tolerances, lockset has been very unstable or entirely inoperative. In order to correct this condition to insure a lockset feature in new couplers, the various manufacturers of this type of coupler have resorted to the practice of bending the lockset end of the knuckle opener forwardly to obtain greater overlap between the lockset portion of the lock and the lockset end of the knuckle opener.

Such attempts to obtain proper operation have resulted in serious difficulties inasmuch as the bending of the knuckle opener has frequently resulted in a condition wherein the lock is not disturbed from its lockset as the knuckle opens thereby resulting in a failure to couple.

Thus it has been found that the degree to which the knuckle opener can be bent to effect lockset is limited and varies in individual coupler assemblies thereby requiring individual bending of the knuckle throwers to be used in such assemblies. Frequently several trials in bending the opener have been required before both functions of lockset and disturbance from lockset are obtained. This practice increases the manufacturing cost and has failed to entirely remedy the above difficulties.

It has been discovered, according to the present invention, that the causes of these difficulties are the same for the Tight-Lock coupler and Type F coupler and that positive action can be afforded by avoiding forward movement of the lock as it is lifted preparatory to lockset and by preventing such forward movement as the lock is lowered to lockset position.

Accordingly, a primary object of the present invention is to provide means for preventing forward movement of the lockset portion of the lock as the latter is elevated and then lowered to its lockset position on the knuckle thrower.

A further object of the invention is to insure disturbance of the lock from its lockset position as the knuckle is opened preparatory to a coupling operation.

The foregoing and other objects and advantages of the invention will become apparent from a consideration of the following specification and the accompanying drawings, wherein:

Figures 8 and 9 illustrate the novel knuckle thrower, Figure 8 being a top plan view, and Figure 9 being a sectional view on the line 9—9 of Figure 8;

Figures 10–17 inclusive, illustrate in detail the novel knuckle, Figure 10 being a top plan view, Figures 11 and 12 being side elevational views taken respectively from the lock engaging face and the buffing face of the knuckle tail, Figure 13 being a rear elevational view, Figure 14 being a fragmentary bottom plan view, and Figures 15–17 inclusive, being sectional views taken respectively on the lines 15—15, 16—16, and 17—17 of Figure 10; and Figures 18–25 inclusive, illustrate a modified knuckle tail particularly adapted for the tight lock A. A. R. Standard H coupler, Figure 18 being a top plan view, Figures 19 and 20 being side elevational views taken respectively from the lock engaging face and buffing face of the knuckle tail, Figure 21 being a rear elevational view, Figure 22 being a fragmentary bottom plan view, and Figures 23–25 inclusive, being sectional views taken respectively on the lines 23—23, 24—24, and 25—25 of Figure 18.

Figure 1:
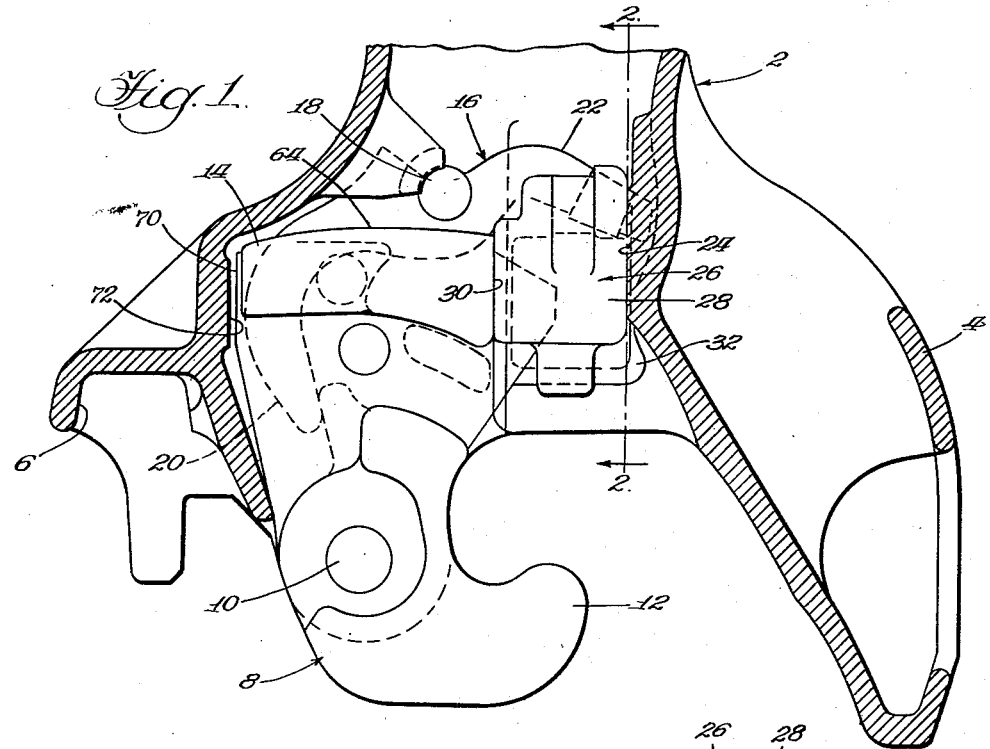
Figure 1 is a horizontal sectional view through a Type F coupler head with the operating mechanism embodying the invention shown in plan view.

Describing the invention in detail and referring first to Figure 1, a coupler head, generally designated 2, comprises a guard arm 4 and a guard arm pocket 6 adapted to receive the guard arm of a mating coupler. A knuckle 8 is pivoted at 10 to the coupler head 2 in the usual manner, and the knuckle comprises a nose portion 12 adapted to interlock with the nose portion of a mated coupler and is provided with a tail 14 of novel form, as hereinafter described in detail.

A knuckle thrower, generally designated 16, is pivoted at 18 to the coupler head 2 in the usual manner. The knuckle thrower comprises a knuckle engaging arm 20 and a lock engaging arm 22 of novel form, as hereinafter discussed.

The coupler head 2 comprises the usual lock cavity defined at one side by a wall 24 and containing a lock, generally designated 26, having a head engageable with the wall 24 and with a surface 30 of the knuckle tail in the locked position shown in Figure 1. The coupler head also comprises an opening or passage 32 containing operating mechanism for the lock, as best seen in Figures 2 to 4.

Figures 2, 3:
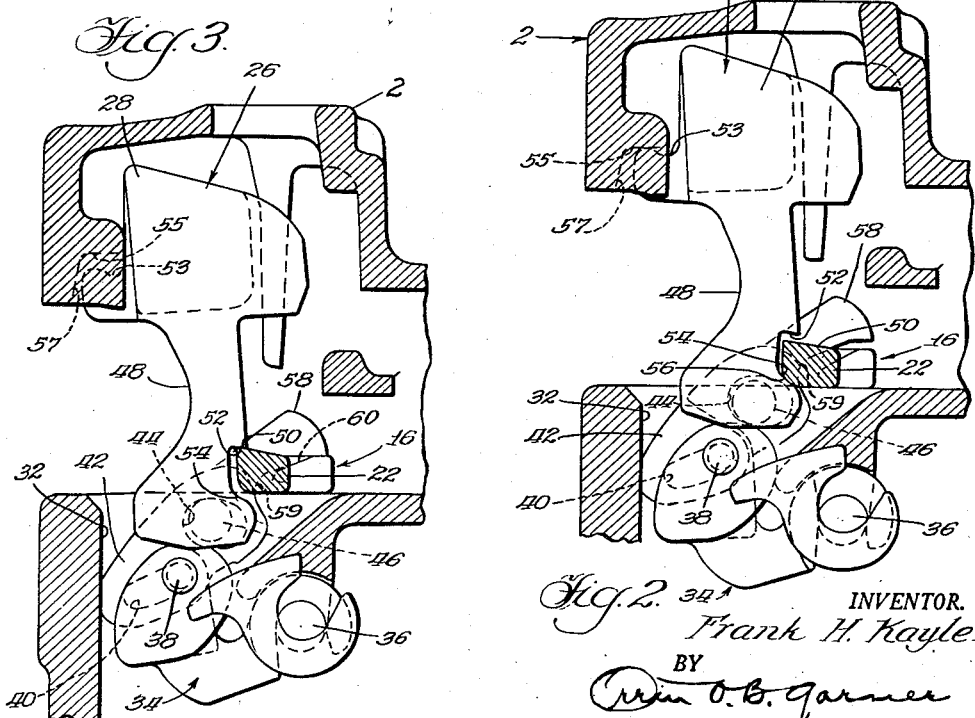
Figure 2 is a sectional view on the line 2—2 of Figure 1 showing the lock in raised position preparatory to lockset.
Figure 3 is a view comparable to Figure 2 with the lock in lockset position.
Figure 4:
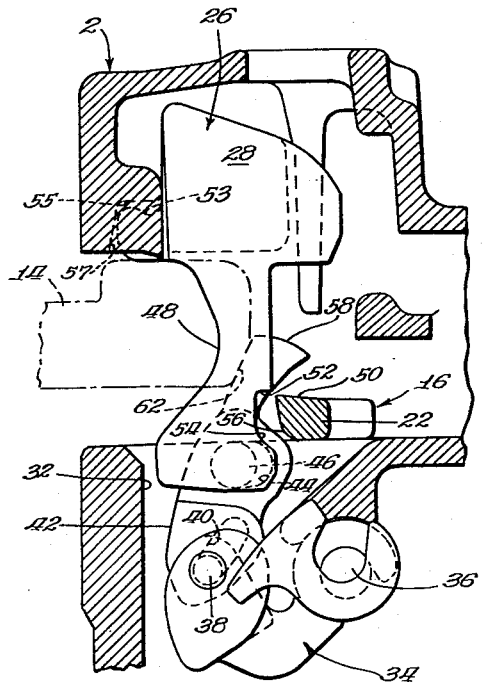
Figure 4 is a view comparable to Figure 2 showing the knuckle tail in open position and the lock disturbed or unseated from its lockset position.

Referring next to Figure 2, the lock operating mechanism comprises a rotor 34 of conventional design pivotally mounted at 36 on a trunnion of the coupler head 2 and adapted for connection in the usual manner to a conventional operating rod (not shown). The rotor 34 is provided with a rivet 38 received within a slot 40 of a conventional toggle or lifter 42 for operation of the latter, as hereinafter described. The toggle 42 comprises a slot 44 receiving a conventional trunnion 46 formed on a leg 48 of the lock 26. The arm 22 of the knuckle thrower 16 is provided with a pad or seat 50 adapted to engage a downwardly facing seat 52 on the tail 48 of the lock.

In Figure 2, the lock is illustrated in a raised position immediately preparatory to lockset position. The lock is raised, as will be readily understood by those skilled in the art, by rotation of the rotor 34 in a clockwise direction, as seen in Figure 2, and the upward movement of the lock is limited by engagement of an abutment 53 with a seat 55 of the coupler head within a recess 57 therein which receives and guides the abutment 53 in conventional manner.

It will be understood, as more fully discussed in the above-mentioned patent, that continued rotation of the rotor 34 from the position shown in Figure 2 effects engagement of the lug 58 on the upper end of the lifter 42 with the thrower arm 22 along the forward edge thereof which engages a shoulder 59 of the lug whereby the latter, at first in conjunction with the lock leg 48 and then alone, is effective to rotate the knuckle thrower 16 on its trunnion 18 in a counterclockwise direction, as seen in Figure 1, to throw the knuckle 8 to open position. This operation is not pertinent to the present invention and, accordingly, the details of construction incident thereto have been eliminated for the sake of clarity.

Figure 5:
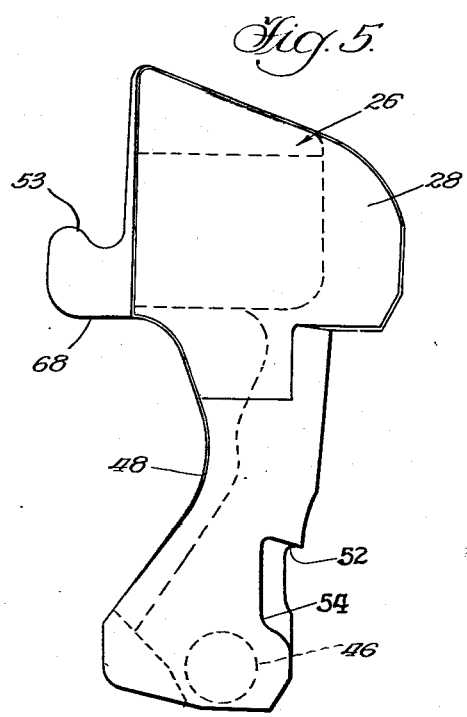

Referring again to Figure 2, it has been found that a primary cause of improper lockset in the prior art has been due to engagement of the knuckle thrower arm 22 at its lower forward edge with the lower extremity of the lock leg 48 as the lock is elevated to the position shown in Figure 2, thereby resulting in a camming action tilting the lower end of the lock forwardly and consequently resulting in failure of the seats 50 and 52 to engage, or resulting in their engagement at the forward edge of the seat 50 from which the lock frequently slipped before opening of the knuckle. According to the present invention, the lock leg 48 is provided with a recess 54, the lower extremity of which lies approximately in a horizontal plane intersecting the trunnion 46, as best seen in Figure 5. Thus in the elevated position shown in Figure 2, when the abutment 53 of the lock 26 engages seat 55, the recess 54 in lock leg 48 receives the knuckle thrower arm 22 as at 56, so that the arm 22 is afforded sufficient clearance from the leg 48, to prevent forward movement thereof as a result of the camming action above described, and to afford positive overlap of the seat 52 and the seat 50 to insure proper lock set when the lock is lowered to lock set position shown in Figure 3.

Figure 3 illustrates the lock 26 in lockset position with its seat 52 engaging the seat 50 of the thrower arm 22. Under these conditions, the lug 58 at the upper end of the toggle 42 is engaged with a complementary seat at 60 on the top of the thrower arm 22. As best seen in Figures 3 and 9, the seat 60 is of novel form and is beveled to afford a diagonal face extending from the forward edge of the thrower arm 22 to a point rearwardly of the longitudinal vertical center plane of the arm 22. It has been found that this construction insures proper engagement between the seats 50 and 52, as illustrated in Figure 3, whereas the prior art construction frequently caused the lock seat 52 to be held above the seat 50 by engagement of the toggle 42 with the rivet 38 and with the thrower arm seat at 60. With the lock held above its seat 50 in this manner, further release of the operating parts has frequently caused the lock to move forward as well as downward, thereby causing the seat 52 to miss the seat 50 with consequent failure of the lock to rest in lockset position. In such prior art arrangements, when toggle 42 rested on rivet 38 and seat 60, the lock was supported above seat 50 by engagement of the trunnion 46 with the bottom wall of the toggle slot 44.

With the improved construction shown in Figure 3, the lock is in proper seating position on seat 50, with clearance between the underside of trunnion 46 and the bottom of the toggle slot, so that the lock is not supported by the toggle 42.

Referring now to Figure 4, the knuckle tail 14 is illustrated in phantom lines, as it moves to open position engaging the lock abutment 53 which raises the lock 26 from lockset position due to tilting the leg 48 of the lock, inasmuch as the abutment 53 is forwardly of its center of gravity.

Figure 7:
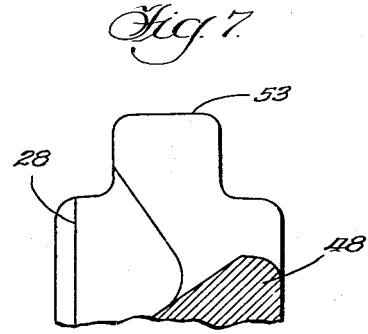
Figures 5 to 7 are enlarged views showing the novel lock, Figure 5 being a side elevational view, Figure 6 being a fragmentary front elevational view, and Figure 7 being a sectional view on the line 7—7 of Figure 6.
Figure 6:
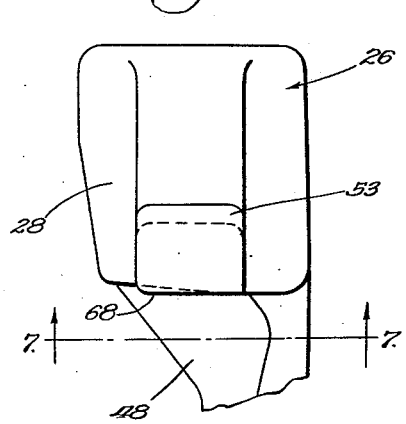

The novel lock is illustrated in detail in Figures 5–7 and comprises the before-mentioned leg 48 connected at its upper end to the head 28 of the lock. The forward surface of the head 28 is provided with the before-mentioned abutment 53 and this abutment, according to the invention, is provided with a downwardly extending projection 68 which projects downwardly below the lower surface of the lock head 28, as best seen in the front elevational view of Figure 6. It has been found that this construction affords a more positive action by the knuckle tail 14 in disturbing the lock from its lockset position, as above described in connection with Figure 4.

It has been discovered, according to the present invention, that the frequent failure of the lock to move from its lockset position has been due to engagement of the knuckle tail with the lug 58 of the toggle 42 which thus restrained the leg 48 of the lock from tilting forwardly from lockset position. Experiments have proved that the novel knuckle tail contour, hereinafter described, affords a positive remedy for this difficulty without impairing the strength or other functions of the knuckle 8.

Figures 10–17 show the novel knuckle tail in detail and it may be noted that this member comprises the above-mentioned lock engaging face or surface 30 at one side thereof and a buffing face or surface 70 at the opposite side thereof, said buffing face being engageable with a buffing wall or surface 72 (Figure 1) of the coupler head 2 when the knuckle 8 is subjected to buffing or compressive forces in service. The knuckle tail also comprises top and bottom pulling lug 74 and 76, as best seen in Figures 11 and 15, respectively, engageable with cooperating coupler head surfaces (not shown) when the knuckle is in closed position and is subjected to pulling or draft forces in service.

An anti-creep lug 78 projects laterally from the knuckle tail beneath the lock engaging surface 30 and said lug, as best seen in Figure 11, comprises an arcuate socket or surface 80 engageable with the lug 58 when the lock 26 is in locked position to prevent accidental upward movement of the lock to unlocked position as is well known to those skilled in the art, and described in detail in the above-identified Metzer patent.

The knuckle tail is preferably cored out as at 82 and the rear edge of the knuckle tail as best seen in the top plan view of Figure 10 is arcuately formed as at 84 on a radius, and this arcuate segment of the rear edge of the knuckle tail extends from the buffing face 70 thereof to approximately the mid-point indicated at 86 in Figure 10. From the point 86 the rear edge of the knuckle tail is formed with a substantially linear segment 88 extending forwardly to the lock engaging surface 30, and the point 86 is located closer to the pivot point 90 of the knuckle than the portion of the segment 84 which merges with the buffing face 70 or the portion of the segment 88 which merges with the lock engaging face 30.

As best seen in Figures 11–13 and 15 the rear edge of the knuckle tail is substantially vertical in form as indicated at 92 (Figure 15) above the horizontal center plane 94 thereof, and below the center plane 94 the rear edge of the knuckle tail is formed with a diagonal surface 96 sloping downwardly and forwardly at an angle of the order of 25°—35° with respect to the vertical.

The beveled surface 96, and the formation of the segments 84 and 88 of the rear edge of the knuckle tail accommodate movement of the knuckle tail to open and closed position without disturbing the lug 58 of the toggle 42 as diagrammatically illustrated in Figure 4 wherein the knuckle tail is illustrated in phantom lines as it moves to open position thereby moving the lock 26 from lockset position preparatory to a coupling operation.

Referring now to Figures 18 to 25 inclusive, which show a modified form of the improved knuckle construction particularly adapted for the A. A. R. Standard H Tight Lock Coupler knuckle, parts of the structure shown in these figures corresponding to those of the previously described embodiment are identified corresponding numerals except as hereinafter discussed. In the modification of Figures 18 to 25 the rear edge of the knuckle tail as seen in plan view is formed as a continuous arcuate surface 100 extending from the buffing face 70 to the lock engaging face 30 and the mid-point 102 of this surface is closer to the pivot point 90 of the knuckle than the edge of the surface 100 which merges with the lock engaging face 30 of the knuckle tail.

The lower segment of the rear edge of the knuckle tail is formed with a diagonal or beveled surface 104 which slopes downwardly and forwardly at an angle of the order of 25°—35° with respect to the vertical and it may be noted that this beveled surface tapers from the lock engaging face 30 toward the mid-point 102 of the rear coupler edge and merges at the point indicated by the line 23—23 of Figure 18 with a beveled surface 106 formed at an angle at the order 40°—45° with respect to the vertical, and with a surface 108 disposed at 20°—35° with respect to the vertical.

The surface 104 terminates approximately midway between surfaces 70 and 30 and accommodates movement of the knuckle tail to open position without disturbing the lug 58 of the toggle 42 as described in detail with respect to the modification of Figures 10 to 17.

It will be understood that the construction and functions of the various operating parts discussed above have not been described in detail inasmuch as the present invention relates to the various features heretofore discussed in detail, which afford a positive lockset and disturbance from lockset without impairing the other features of this type of coupler which is shown and described in detail in the above-mentioned Metzger patent.

I claim:

1. In an automatic railway car coupler, a head, a knuckle pivoted thereto, a knuckle thrower pivoted in the head and operatively associated with the knuckle for throwing the latter to open position, a lock for said knuckle having an abutment engageable with a downwardly facing head surface to limit upward movement of the lock above lockset position, said lock having a lockset seat adapted to engage a seat on the thrower, a rotor pivoted to the head, a toggle having a pin and slot connection to the rotor and a trunnion and slot connection to the lock, a lug on the toggle above the last-mentioned connection having a shoulder engageable with the thrower to operate the latter, a recess in the lock, in which recess the thrower is received without pressure thereagainst when the lock is placed above lockset position with said abutment engaging said downwardly facing head surface, a seat on the knuckle thrower engageable with the lug when the lock is in lockset position and the forward surface of the trunnion is spaced from the forward edge of its slot, said last mentioned slot being approximately horizontal when the lock is in lockset position, and a tail portion on the knuckle engageable with a downwardly facing surface of said abutment to lift the lock from lockset position, said tail portion, as seen in top plan view, having a partly arcuate and partly angular rear surface extending inwardly from its outer edge, the lower rear extremity of said tail portion being beveled between 25° and 35° from the vertical, to afford clearance from the lug as said portion engages said downwardly facing surface of said abutment.

2. In an automatic railway car coupler comprising a head, a knuckle pivoted thereto, a knuckle thrower pivotally mounted in the head and operatively associated with the knuckle for throwing the latter to open position, a lock for said knuckle, said lock having an abutment part on its forward surface engageable with a downwardly facing coupler surface to limit upward movement of the lock above lockset position, and said lock having a lockset seat adapted to engage a seat on the thrower, a rotor pivoted to the head, and a toggle having a pin and slot connection to the rotor and a trunnion and slot connection to the lock, the toggle having a lug with a shoulder adapted to engage the thrower for operating the latter; the combination of means on the thrower for supporting the lug at a point whereat the trunnion is spaced from the bottom and the forward surface of its slot, said last mentioned slot being approximately horizontal when the lock is in lockset position, and a tail portion on the knuckle having a locking surface and an approximately perpendicular rear surface, a portion of which is radial and a portion angular, as seen in top plan view, said tail portion being adapted to engage the bottom of said abutment part to lift the lock and rotate the latter from lockset position as the knuckle opens, and a beveled surface on the bottom rear edge of the knuckle tail constructed and arranged to clear the lug as the knuckle tail moves to open position.

3. In an automatic railway car coupler comprising a head, a knuckle pivoted thereto, a knuckle thrower pivoted in the head and operatively associated with the knuckle for throwing the latter to open position, a lock for said knuckle having a part engageable with a downwardly facing coupler surface to limit upward movement of the lock above lockset position, said lock having a lockset seat adapted to engage a seat on the thrower, a rotor pivoted to the head, a toggle having a pin and slot connection to the rotor and a trunnion and slot connection to the lock, and a lug on the toggle above the last-mentioned connection having a shoulder engageable with the thrower to operate the latter; the combination of a recess in the lock, said recess receiving the thrower without the lock exerting pressure against the thrower when said part initially engages said surface prior to dropping of the lock to lockset position, and a seat on the knuckle thrower engageable with the lug when the lock is in lockset position and the trunnion is spaced from the bottom and the forward edge of its slot, said last mentioned slot being approximately horizontal when the lock is in lockset position.

4. In an automatic railway car coupler comprising a head, a knuckle pivoted thereto, a knuckle thrower pivotally mounted in the head and operatively associated with the knuckle for throwing the latter to open position, a lock for said knuckle, said lock having an abutment part on its forward surface engageable with a downwardly facing coupler surface to limit upward movement of the lock above lockset position, and said lock having a lockset seat adapted to engage a seat on the thrower, a rotor pivoted to the head, and a toggle having a pin and slot connection to the rotor and a trunnion and slot connection to the lock, the toggle having a lug with a shoulder adapted to engage the thrower for operating the latter; the combination of means on the knuckle thrower adapted to support the lug without disturbing the lock from lockset position, and a recess in the lock, said recess receiving the thrower without pressure by the lock against the thrower when said abutment part initially engages said downwardly facing coupler surface, said trunnion slot being substantially horizontal when the lock is in lockset position.

5. In an automatic railway car coupler, a head, a knuckle pivoted thereto, a knuckle thrower pivoted in the head and operatively associated with the knuckle for throwing the latter to open position, a lock for said knuckle having a part engageable with a downwardly facing coupler surface to limit upward movement of the lock above lockset position, said lock having a lockset seat adapted to engage a seat on the thrower, a rotor pivoted to the head, a toggle having a pin and slot connection to the rotor and a trunnion and slot connection to the lock, and a lug on the toggle above the last-mentioned connection having a shoulder engageable with the thrower to operate the latter, and a seat on the knuckle thrower engageable with the lug when the lock is in lockset position, and the trunnion is spaced from the bottom and the forward edge of its slot, said last mentioned slot being approximately horizontal when the lock is in lockset position.

6. A railway coupler knuckle having nose and tail portions and having a substantially vertical pin hole between said portions, said tail portion having a lock engaging face on one side thereof and said tail portion having a rear surface comprising rearwardly converging segments, as seen in top plan view, said segments converging to a point between the ends of said rear surface, one of said segments extending approximately linearly from said point to the rear extremity of said face, the lower edge of said rear surface sloping downwardly and forwardly toward said nose portion.

References Cited in the file of this patent

UNITED STATES PATENTS

| Number | Name | Date |
|---|---|---|
| 2,350,470 | Metzger | June 6, 1944 |
| 2,585,958 | Metzger | Feb. 19, 1952 |